United States Patent
Nitsche

(10) Patent No.: US 11,092,942 B2
(45) Date of Patent: Aug. 17, 2021

(54) METHOD FOR OPERATING AN ELECTRIC OR FLUIDIC ACTUATOR USING A MONITORING MEANS FOR OUTPUTTING A FAULT SIGNAL AND MOVEMENT CONTROLLER FOR AN ACTUATOR

(71) Applicant: Festo SE & Co. KG, Esslingen (DE)

(72) Inventor: Rainer Nitsche, Kircheim (DE)

(73) Assignee: FESTO SE & CO. KG, Esslingen (DE)

( * ) Notice: Subject to any disclaimer, the term of this patent is extended or adjusted under 35 U.S.C. 154(b) by 485 days.

(21) Appl. No.: 15/578,913

(22) PCT Filed: Jun. 11, 2015

(86) PCT No.: PCT/EP2015/063047
§ 371 (c)(1),
(2) Date: Dec. 1, 2017

(87) PCT Pub. No.: WO2016/198109
PCT Pub. Date: Dec. 15, 2016

(65) Prior Publication Data
US 2018/0217573 A1  Aug. 2, 2018

(51) Int. Cl.
*G05B 19/19* (2006.01)

(52) U.S. Cl.
CPC .... *G05B 19/19* (2013.01); *G05B 2219/41427* (2013.01); *G05B 2219/41434* (2013.01); *G05B 2219/41447* (2013.01)

(58) Field of Classification Search
CPC .......... G05B 19/19; G05B 2219/41427; G05B 2219/41434; G05B 2219/41447
See application file for complete search history.

(56) References Cited

U.S. PATENT DOCUMENTS 3,739,158 A * 6/1973 Woodward .......... G05B 19/237
318/571
4,707,780 A   11/1987 Gose et al.
(Continued)

FOREIGN PATENT DOCUMENTS

| DE | 102008052255 | 4/2010 |
| EP | 1437637 | 7/2004 |
| EP | 1785792 | 5/2007 |

OTHER PUBLICATIONS

Andrew Tanenbaum, Structured Computer Organization, 1984, Prentice-Hall, p. 11 (Year: 1984).*

*Primary Examiner* — Kenneth M Lo
*Assistant Examiner* — Jonathan Michael Skrzycki
(74) *Attorney, Agent, or Firm* — Hoffmann & Baron, LLP

(57) ABSTRACT

A method for operating an electric or fluidic actuator, for which a setpoint position is predefined, includes the steps: provision of the setpoint position to a path planning unit and calculation of movement values from the setpoint position, provision of the movement values by the path planning unit to an open-loop control circuit and a closed-loop control circuit, calculation of a first manipulated variable component dependent on the movement values in the open-loop control circuit and calculation of a second manipulated variable component dependent on the movement values and on position signals of a position sensor assigned to the actuator in the closed-loop control circuit, combining of the first and the second manipulated variable component in an control unit and provision of a control signal resulting from the manipulated variable components to the actuator.

15 Claims, 2 Drawing Sheets

(56) References Cited

U.S. PATENT DOCUMENTS

| | | | | |
|---|---|---|---|---|
| 5,656,903 | A | 8/1997 | Shui et al. | |
| 2004/0135534 | A1* | 7/2004 | Cullen | G05B 17/02 |
| | | | | 318/609 |
| 2008/0180052 | A1* | 7/2008 | Iwashita | G05B 19/19 |
| | | | | 318/615 |
| 2008/0215164 | A1* | 9/2008 | Denk | G05B 19/19 |
| | | | | 700/29 |
| 2008/0258671 | A1* | 10/2008 | Iwashita | G05B 19/19 |
| | | | | 318/632 |
| 2010/0091262 | A1* | 4/2010 | Tousain | G03B 27/58 |
| | | | | 355/72 |
| 2010/0175480 | A1* | 7/2010 | Guy | G01N 3/32 |
| | | | | 73/660 |
| 2011/0278129 | A1* | 11/2011 | Gorius | F16D 48/066 |
| | | | | 192/85.01 |
| 2013/0325294 | A1* | 12/2013 | Wagner | F02D 41/2474 |
| | | | | 701/103 |
| 2016/0004248 | A1* | 1/2016 | Oda | G05B 19/19 |
| | | | | 700/170 |
| 2016/0077505 | A1* | 3/2016 | Dirkx | G05B 17/02 |
| | | | | 700/275 |

* cited by examiner

METHOD FOR OPERATING AN ELECTRIC OR FLUIDIC ACTUATOR USING A MONITORING MEANS FOR OUTPUTTING A FAULT SIGNAL AND MOVEMENT CONTROLLER FOR AN ACTUATOR

This application claims priority based on an International Application filed under the Patent Cooperation Treaty, PCT/EP2015/063047, filed Jun. 11, 2015.

BACKGROUND OF THE INVENTION

The invention relates to a method for operating an electric or fluidic actuator, for which a setpoint position is predefined, in particular by a higher-level control device, comprising the steps: provision of the setpoint position, in particular by a higher-level control device, to a path planning unit and calculation of movement values on the basis of the setpoint position, provision of the movement values by the path planning unit to an open-loop control means and to a closed-loop control means, calculation of a first manipulated variable component dependent on the movement values in the open-loop control means and calculation of a second manipulated variable component dependent on the movement values and on position signals of a position sensor assigned to the actuator in the closed-loop control means, combining of the first and second manipulated variable components in an control unit and provision of a control signal resulting from the manipulated variable components to the actuator. The invention also relates to a movement controller for an actuator.

Such a method and such a movement controller are aimed at allowing sophisticated actuator regulation using the lowest-possible computing capacity. In doing so, it is assumed that the setpoint position is provided optionally via a communications bus by a higher-level control device, which could, by way of example, be a programmable logic controller (PLC), or by a local input unit. The setpoint position is provided, in particular, in the form of a digitally coded signal or an electric current and/or voltage level to a path planning unit. There a calculation is performed of movement values based on the setpoint position, possibly also involving the actual position of the actuator. The path planning unit provides one or more movement values, by way of example an actuator travel and/or an actuation speed and/or actuation acceleration and/or an actuation jolt both to an open-loop control means and a closed-loop control means. In the open-loop control means, a calculation is performed of a first manipulated variable component dependent on the movement values. In the closed-loop control means, a calculation is performed of a second manipulated variable component dependent on the movement values and on position signals of a position sensor associated with the actuator. The calculated manipulated variable components are then combined in an control unit and from there provided as a control signal to the actuator.

From DE 10 2008 052 255 A1 a method is known for controlling an actuator for a valve of an internal combustion engine with the following steps: calculating a target force for the actuator on the basis of an internal cylinder pressure and a pressure in the intake manifold and/or an exhaust gas back pressure, wherein from a crank angle in a setpoint generator at least one target state quantity is determined over time and from the target state quantity in a flatness-based pilot control a target force of the actuator is determined and compared with an actual value of the corresponding state quantity and a vectorial difference is determined and from this in an extended state controller target force of the actuator is determined; wherein the target force is adapted from vectorial differences determined in a plurality of steps and the target forces are added to give a total force and from the total force by means of at least one curve and/or at least one map as a function of a current and predicted valve travel a setpoint for at least one actuating current of the actuator is determined.

SUMMARY OF THE INVENTION

The object of the invention is to provide a method for operating an electric or fluidic actuator and a movement controller for an actuator, allowing simple function diagnostics.

This object is achieved for a method of the abovementioned type by the following features; Here it is provided that a method for operating an electric or fluidic actuator, for which a setpoint position is predefined, in particular by a higher-level control device, comprises the steps: provision of the setpoint position, in particular by a higher-level control device, to a path planning unit and calculation of movement values on the basis of the setpoint position, provision of the movement values by the path planning unit to an open-loop control means and to a closed-loop control means, calculation of a first manipulated variable component dependent on the movement values in the open-loop control means and calculation of a second manipulated variable component dependent on the movement values and on position signals of a position sensor assigned to the actuator in the closed-loop control means, combining of the first and second manipulated variable components in an control unit and provision of a control signal resulting from the manipulated variable components to the actuator, wherein a monitoring means performs the monitoring of at least one manipulated variable component and provides a fault signal if the monitored manipulated variable component exceeds a predefinable threshold component at the control signal.

In a suitable design of the open-loop control means and of the closed-loop control means, in regular operating states of the actuator an, in particular predefinable, manipulated variable component of the closed-loop control means occurs, which should not exceed a predefined maximum value. Here, regular operating states should be taken to mean those operating states which can arise without the presence of a mechanical and/or electrical and/or fluidic fault and which preferably comprise all settings and all permitted speed and all permitted accelerations of the actuator. Basically, it can be assumed that in regular operating states of the actuator the manipulated variable component of the open-loop control means is considerably greater than the manipulated variable component of the closed-loop control means. By way of example, it can be assumed that in regular operating states of the actuator the manipulated variable component of the closed-loop control means is less than 20 percent, ideally in the region of less than 5 percent. Conversely, if at least one mechanical and/or electrical and/or fluidic fault occurs at the actuator a change in the ratio of the two manipulated variable components of the open-loop control means and the closed-loop control means occurs. This is attributable to the fact that due to the occurrence of the fault the actuator is no longer able to act on the control signals provided in the same way as it would in the absence of the fault. Therefore, in order to achieve the setpoint position for the actuator represented by the setpoint, a readjustment of the movement of the actuator must be carried out. This results in an increase in the manipulated variable component of the closed-loop control means, which can be determined with the help of the monitoring means and which if a predefinable threshold component is exceeded leads to a fault signal being output. This fault signal can, by way of example lead, in a movement controller associated with the actuator, in which preferably also the method is running, to the output of user information, by way of example in the form of a light signal and/or switching signal. Additionally, or alternatively, it can be provided that the movement controller provides a suitable electrical signal to a higher-order control device, in particular a programmable logic controller or a control system. In any case, by comparing the first and second manipulated variable components a clear statement can be made on whether the actuator is still working correctly or if there are faults. Typically, prior to the comparison of the two manipulated variable components, filtering or other pre-processing of at least one of the manipulated variable components, in particular of the second manipulated variable component takes place, in particular in order to eliminate high-frequency signal components. The comparison of the manipulated variable components is of particular interest in respect of preventive maintenance since, by way of example, by observing the manipulated variable components over a long period gradual changes in the control behaviour can be detected. As a result of the nature and the occurrence of these changes, conclusions can be drawn on possible wear processes that may be taking place in the actuator, based on which optionally preventive and/or needs-based maintenance or if necessary an exchange of the actuator can take place at a favourable time, without massive disruption to an entire system, of which the actuator forms a part, having to be considered.

Advantageous developments of the invention are the subject-matter of the subclaims.

It is expedient if, in the path planning unit, a check is performed of the setpoint position provided, for conflicts with predefinable movement restrictions and/or manipulated variable restrictions, before calculation of the movement values takes place. When calculating the movement values, which takes place in the path planning unit, predefinable boundary conditions such as, by way of example, movement restrictions, which, by way of example, may be predefined by mechanical excursion limits of the actuator, and/or manipulated variable restrictions such as, by way of example, a maximum actuation speed for the actuator, can also be taken into consideration. By taking into consideration such boundary conditions, by way of example, an overload of the actuator can be avoided. Furthermore, it can similarly be avoided that a manipulated variable component of the closed-loop control means also increases without the presence of a fault simply because the actuator for technical reasons is unable to act on the control signal in the predefined manner.

In an advantageous development of the invention it is provided that in the open-loop control means a calculation of the first manipulated variable component is performed with an inverse model of the control path. Here the inverse model of the control path comprises all parameters necessary for the most precise possible description of the behaviour of the actuator in the context of a desired or necessary accuracy of the model. Due to the algebraic structure of the inverse model, also referred to as an inverse system, in the open-loop control means, from the movement values provided by the path planning unit, the first manipulated variable component can be calculated using relatively little computing capacity. It is advantageous here in particular that the calculation of the first manipulated variable component from the movement value or values does not require integration of differential equations, meaning that the computing power required by the open-loop control means can be kept low.

It is preferably provided that in the inverse model of the control path a number of model parameters of a fluid valve movably coupled with the actuator, from the group: fluid mass flow, fluid pressure, or valve body restoring force, are taken into account. These model parameters allow the components driven by the actuator, which may in particular involve a fluid valve, to be taken into account when determining the manipulated variable component as realistically as possible and in this way the control performance for the actuator to be improved. Furthermore, such inclusion of the components driven by the actuator also allows account to be taken, and in particular identification, of faults in these components. Accordingly, the inverse model of the control path thus preferably contains both the model parameters of the actuator and the model parameters of the components driven by the actuator, in particular the fluid valve.

It is advantageous if, in the closed-loop control means, in addition to the calculation of the second manipulated variable component, a calculation of a controller fault value is performed with a fault model and/or that in the open-loop control means, in addition to the calculation of the first manipulated variable component with the inverse model of the control path, a calculation of a control fault value is performed with an inverse fault model. In doing so, it can be provided that one or more fault models or inverse fault models are contained in the closed-loop control means and/or in the open-loop control means, which are respectively optimised for identification of certain faults and allow particularly early detection of these particular faults. This is of particular interest if, faults that may arise could seriously affect the functioning of the actuator and/or of the components driven by the actuator, but in the first and second manipulated variable components are only felt to a minor extent or detected only very much later. The controller fault value output by the fault model in the closed-loop control means and/or the control fault value output by the fault model in the open-loop control means can in particular be fed to the monitoring means, in order to be compared there with predefined threshold values and if the threshold value is exceeded to be output as a fault signal.

In a further configuration of the invention, it is provided that the monitoring means performs a monitoring of the second manipulated variable component and that the monitoring means provides the fault signal if the exceeding of the predefinable threshold component at the control signal by the second manipulated variable component lasts longer than a predefinable timespan or an integral of the second manipulated variable component exceeds a predefinable value. To avoid unnecessary fault messages, it is provided that a fault signal is only sent if the exceeding of the predefinable threshold component at the control signal lasts for longer than a predefinable timespan or an integral of the second manipulated variable component exceeds a predefinable value. By way of example, various time conditions can be set; in particular it can be provided that a fault signal is only output if the exceeding of the predefinable threshold component falls within an associated time interval. Alternatively, it can be provided that a fault signal is sent if an exceeding of the predefinable threshold component has taken place in a number of individual lengths of time separated by time gaps, but which in total exceed a predefinable duration. In particular, it can be provided that an integral of the second manipulated variable component is generated, wherein exceeding of a predefinable integral value leads to the fault signal being output.

It is expedient if the open-loop control means calculates the first manipulated variable component with a flatness-based pilot control and that the closed-loop control means on the basis of the sensor signal performs an adaptation of the control signal to the movement values provided with the second manipulated variable component.

In an advantageous development of the invention it is provided that in the event also of exceeding the predefinable threshold component at the control signal by the second manipulated variable component, in particular for longer than a predefinable timespan or exceeding a predefinable integral value, continued driving of the actuator is performed. A significant advantage here is the combined driving of the actuator with the two manipulated variable components, attributable to the open-loop control means and the closed-loop control means. Provided that the fault occurring at the actuator or at the components driven by the actuator does not lead to complete failure, the method allows continued operation, possibly with reduced performance or dynamic control, of the actuator and the components driven, with simultaneous sending of the sensor signal, in order to be able to take corresponding measures to allow clearance of the fault.

The object of the invention is also achieved by a movement controller for an actuator which comprises an input interface, configured to receive a setpoint position, in particular from a higher-level control device, a drive interface, configured to provide a power flow to an actuator and for receiving a position sensor associated with the actuator, a computing unit, configured to process the setpoint position and provide a control signal and a power amplifier arrangement, configured to provide the power flow to the drive interface as a function of the control signal, wherein it is provided that the computing unit is arranged to carry out the method according to the invention.

In an advantageous development of the movement controller it is provided that the computing unit contains the path planning unit, the open-loop control means, the closed-loop control means, the monitoring means and the control unit as software modules. By way of example, it is provided that the computing unit is configured as a microprocessor or microcontroller and has at least one memory area in which software modules can be stored with which the method according to the invention.

In a further design of the movement controller it is provided that the computing unit contains the path planning unit, the open-loop control means, the closed-loop control means, the monitoring means and the control unit as components of an electronic, in particular integrated, circuit. In this case, the computing unit is in particular configured as an ASIC (application specific integrated circuit) and comprises a freely programmable memory area, in which the model parameters for the actuator to be driven can be written.

It is advantageous if an actuator configured as a fluidic actuator is connected to the drive interface and that the power amplifier arrangement is configured as a valve arrangement for provision of a fluidic power flow to the actuator.

It is expedient if an actuator configured as an electric actuator is connected to the drive interface and that the power amplifier arrangement is configured as an electronic switch arrangement for providing an electric power flow to the actuator.

It is advantageous if the actuator is movably coupled with a fluid valve and if in an inverse model the control path includes a plurality of model parameters of the fluid valve from the group: fluid mass flow, fluid pressure, and valve body restoring force.

BRIEF DESCRIPTION OF THE DRAWINGS

An advantageous embodiment of the invention is illustrated in the drawing. This shows as follows.

DETAILED DESCRIPTION OF THE PREFERRED EMBODIMENTS

Figure 1:
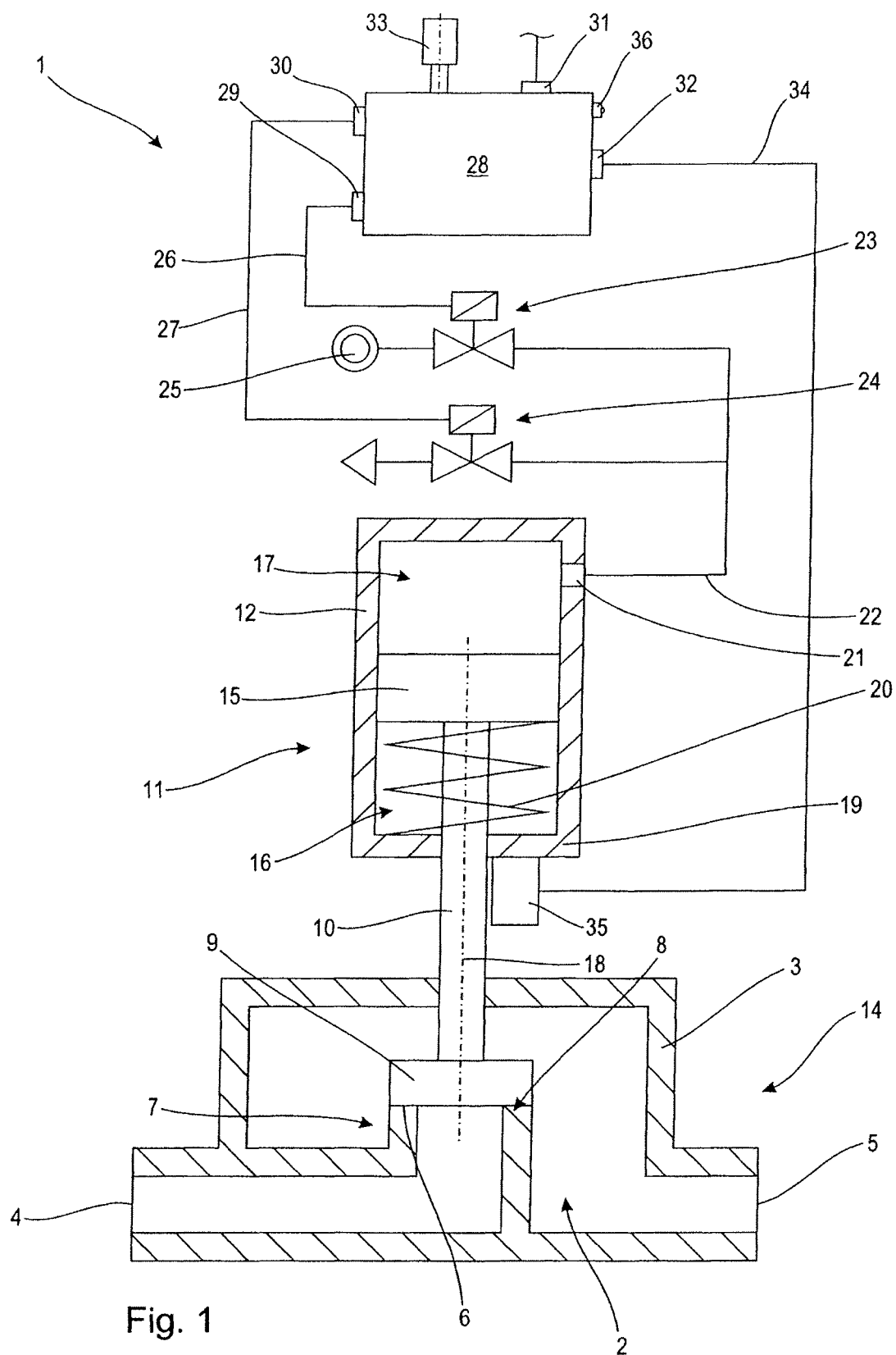
FIG. 1 a schematic representation of a process valve, comprising a movement controller, a fluidic actuator and a valve device, FIG. 2 a schematic block diagram of the functions of the movement controller, and FIG. 3 a highly simplified flow diagram of the processing of target values in the movement controller.

A process valve 1 shown schematically in FIG. 1 is configured to influence a fluid flow of a process fluid not shown in more detail in a fluid channel 2. By way of example, the fluid channel 2 is delimited by a valve housing 3, having an inlet connection 4 and an outlet connection 5 as well as a valve seat 6. The valve seat 6 is configured as an opening of a tubular section 7 of the fluid channel 2 and has a circular front face 8. A valve seat 6 rests, forming a seal, against the valve body 9, coupled with a push rod 10, which for its part is connected with an actuator 11. Here, the valve body 9 and the valve housing 3 with the valve seat 6 configured therein and the inlet connection 4 and the outlet connection 5 form a valve 14.

The actuator 11 involves a single-acting, spring-loaded fluid cylinder, comprising a cylinder housing 12 and a sliding and sealing working piston 15 in the cylinder housing 12. Here, the working piston 15 and a recess 16 in the cylinder housing 12 form a fluidic working space 17, which can be filled with a pressurised fluid to perform a linear movement of the working piston 15 along a movement axis 18.

As can be seen from the representation in FIG. 1, the working piston 15 is in a first functional position, in which the valve body 9 rests, forming a seal, against the valve seat 6. In this functional position, a return spring 20 is also arranged between the working piston 15 and an end region 19 of the cylinder housing 12 is deformed and has in this way stored kinetic energy. When there is a drop in the prevailing fluid pressure in the working space 17, the return spring 20 allows an opening movement for the valve body 9, as a result of which this is raised from the valve seat 6 and releases a fluidically communicating cross-section between the inlet connection 4 and the outlet connection 5. This allows a process fluid to flow between the inlet connection 4 and the outlet connection 5.

To allow provision of pressurised fluid to the working space 17 the cylinder housing 12 has a connection opening 21, to which a fluid line 22 is connected. The fluid line 22 is connected both with a supply valve 23 and with a drain valve 24. Here, the supply valve 23 is intended for setting a fluid flow from a fluid source 25 to the working space 17, whereas the drain valve 24 is configured to take fluid away from the working space 17. By way of example, it is provided that the supply valve 23 and the drain valve 24 are configured as electrically controlled proportional valves.

Accordingly, the supply valve 23 and the drain valve 24 are electrically connected via control lines 26, 27 with drive interfaces 29, 30 of a movement controller 28, the functioning of which is described in more detail in connection with FIGS. 2 and 3.

As can also be seen from the representation in FIG. 1, the movement controller 28 also has a control interface 31, a sensor interface 32 and by way of example an input means 33. The input means, by way of example, involves a control knob, with the help of which a potentiometer (not shown) can be moved, in order to manually provide a setpoint to the movement controller 28. The control interface 31 is configured for a communication with a higher-level control device (not shown), preferably via a communication bus, in particular a programmable logic controller (PLC). The sensor interface 32 is electrically connected via a sensor line 34 with a position sensor 35 which, by way of example, is arranged at a front end region 19 of the sensor housing 12 next to the push rod 10. The job of the position sensor 35 is to provide a sensor signal dependent upon the position of the push rod 10 along the movement axis 18 to the movement controller 28. Purely by way of example, on the movement controller 28 a signalling device 36 by way of example configured as a light emitting diode is arranged, the function of which is similarly explained in more detail in connection with FIG. 2.

Figure 2:
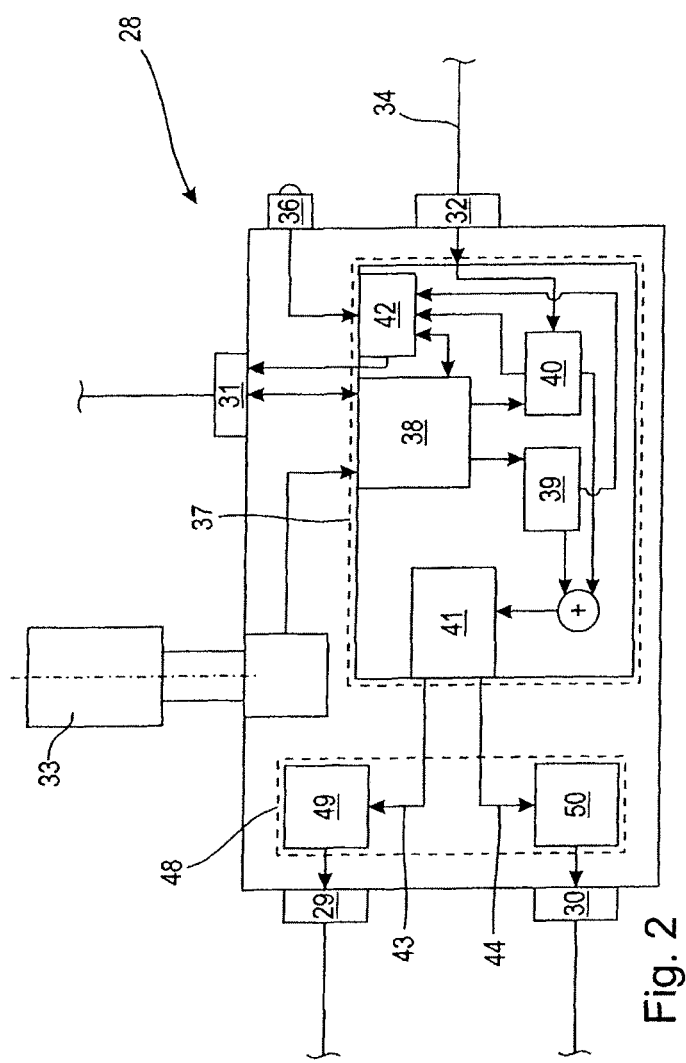

As can be seen from the schematic block diagram of FIG. 2, the movement controller 28 comprises a plurality of functional components, which are in particular configured as a computing unit 37 and as a power amplifier arrangement 48. The computing unit 37 is broken down purely schematically into various function blocks, configured for a partially unidirectional and partially bidirectional data exchange as explained in more detail below. The power amplifier arrangement 48 involves, by way of example, electronic switching mechanisms 49, 50, in particular field effect transistors, which can be driven with the help of control signals from the computing unit 37, to provide electrical power to the drive interfaces 29, 30 and thus allow an opening or closing movement of the associated valves (supply valve 23, drain valve 24).

The description below of the functional blocks in the computing unit 37 is valid both for a design of these function blocks as discrete or integrated circuit components of the computing unit 37 and as software modules, able to run on the computing unit 37.

Purely by way of example, it is provided that the computing unit 37 comprises a path planning unit 38, an open-loop control means 39, a closed-loop control means 40, a control unit 41 and monitoring means 42.

Here, the task of the path planning unit 38 is to provide at least one movement value to the open-loop control means 39 and to the closed-loop control means 40 as a function of a setpoint position, which is optionally provided by a higher-level control device to the control interface 31 or by input means 33, which by way of example involves a rotary potentiometer. In the path planning unit 38 a calculation takes place of the at least one movement value from the setpoint position. It is preferably provided that the path planning unit 38 provides a target position and/or a target speed and/or a target acceleration and/or a target jolt for the movement of the actuator 11. By way of example, it is assumed that the path planning unit 38 has no knowledge of the actual position of the actuator 11 and the components coupled thereto, which according to FIG. 1 by way of example can involve the push rod 10 and the valve body 9 attached thereto. In fact, the task of the path planning unit 38 is to check the setpoint position provided for plausibility and take into account any restrictions present on the movement of the actuator 11 and the components coupled thereto and as a function of these restrictions to output the necessary movement values.

These movement values are processed in the open-loop control means 39 and in the closed-loop control means 40 and result in setpoint signals, which are received and combined by the control unit 41 and converted there into suitable control signals 43, 44 for the electrical switching mechanisms 49, 50 of the power amplifier arrangement 48. On the basis of the control signals 43, 44, in the switching mechanisms 49, 50, a corresponding release then takes place of electrical power to the drive interface 29, 30, so that the respectively connected valves (supply valve 23, drain valve 24) in each case are able to take a desired functional position.

The computing unit 37 further comprises the monitoring means 42, which is preferably configured in the same way as the control unit 41 for receipt of the respective setpoint signals from the open-loop control means 39 and from the closed-loop control means 40 and which is configured to evaluate the manipulated variable components provided, to allow a distinction between a correct functioning of the connected actuator 11 and a faulty functioning of the connected actuator 11. To this end, in particular the manipulated variable component of the open-loop control means 39 is compared with the manipulated variable component of the closed-loop control means 40 in order that, based on the ratio of the manipulated variable components that has been found the desired diagnostics function can be carried out. Here, the expectation is that the manipulated variable component of the open-loop control means 39 is considerably greater than the manipulated variable component of the closed-loop control means 40. Where this is the case, a correct functioning of the actuator can be assumed. If, however, it is determined by the monitoring means 42 that the manipulated variable component of the closed-loop control means 40 is, in particular, for longer than a predefinable period, above a predefinable threshold value, then the monitoring means 42 are configured to output a fault signal, which optionally or cumulatively can be provided to the control interface 31 and/or the signalling device 36, in order to signal a fault in the actuator 11 or the associated components, in particular of the valve 14.

Figure 3:
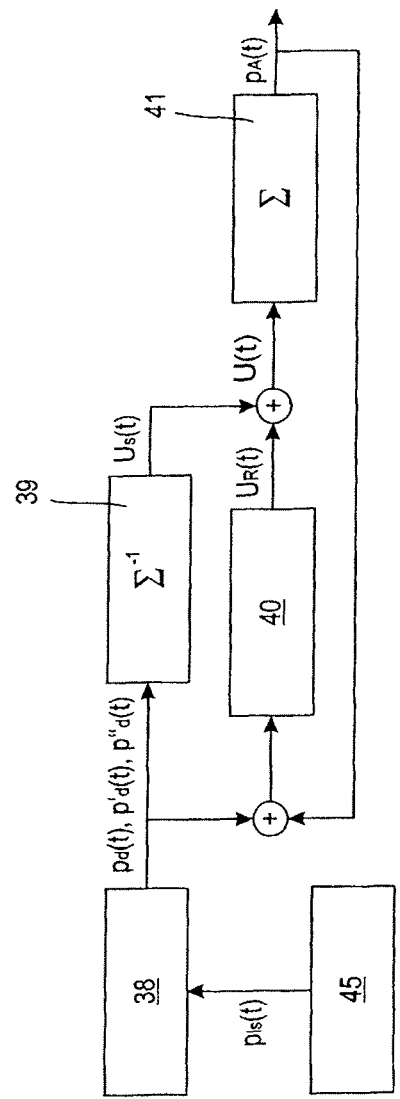

FIG. 3 shows a highly abstract representation of the calculation process for determining the at least one control signal 43, 44, wherein FIG. 3 is merely another type of graphic representation of the components shown in FIGS. 1 and 2, meaning that the same reference numerals are used. For the calculation process it is assumed that a setpoint position is provided to the actuator 11 in the form of a time-dependent position value X1s(t) by the higher-level control device 45 via the control interface 31 not shown in more detail to the path planning unit 38, also known as a trajectory generator. In the path planning unit 38 the calculation is performed of a number of movement values as a function of the setpoint position $x1_s(t)$ provided. By way of example, the movement values comprise a target position xd(t) and a first derivation x'd(t) of the target position (target speed), a second derivation of the target position x"d(t) (target acceleration) and a third derivation of the target position x'"d(t) (target jolt). These movement values are supplied to the open-loop control means 39 and the closed-loop control means 40, before they are made available to the closed-loop control means 40. The open-loop control means 39 comprise an inverse model $\Sigma^{-1}$ of the control path, so that an input of the movement values into the open-loop control means 39 leads to the output of a first manipulated variable $U_s(t)$, also referred to as a first manipulated variable component. By way of example, the closed-loop control means 40 is configured as a PI-controller and outputs a second manipulated variable $U_R(t)$ also referred to as a second manipulated variable component. The two manipulated variable components are combined in the control unit 41 to form a manipulated variable U(t) and then supplied to the path to be controlled 46 ($\Sigma$), fitted with the position sensor 35, the signal of which is supplied via the sensor line 34 to the closed-loop control means 40.

The invention claimed is:

1. A method for operating an electric or fluidic actuator for which a setpoint position is predefined, the method comprising:

provision of a computing unit having software modules to the electric or fluidic actuator, the software modules comprising a path planning unit, a monitoring means, an open-loop control means, a closed-loop control means and a control unit;

provision of the setpoint position to the path planning unit and calculation of movement values (xd(t), x'd(t), x"d(t), x'''d(t)) from the setpoint position, the movement values being values selected from the group consisting of: a position of the actuator; a velocity of the actuator; an acceleration of the actuator; a jolt of the actuator;

provision of the movement values (xd(t), x'd(t), x"d(t), x'''d(t)) by the path planning unit to the open-loop control means and the closed-loop control means;

calculation of a first manipulated variable component dependent on the movement values (xd(t), x'd(t), x"d(t), x'''d(t)) in the open-loop control means;

calculation of a second manipulated variable component dependent on the movement values (xd(t), x'd(t), x"d(t), x'''d(t)) and on position signals of a position sensor assigned to the actuator in the closed-loop control means;

combining of the first and the second manipulated variable component in the control unit; and provision of a control signal resulting from the manipulated variable components to the actuator, wherein the monitoring means performs a monitoring of at least one of the first manipulated variable component from the open-loop control means and the second manipulated variable component from the closed-loop control means, and provides a fault signal if the monitored manipulated variable component exceeds a predefined threshold component at the control signal.

2. The method according to claim 1, wherein, in the path planning unit, a check is performed of the setpoint position provided for conflicts with predefinable movement restrictions and/or manipulated variable restrictions, before calculation of the movement values (xd(t), x'd(t), x"d(t), x'''d(t)) takes place.

3. The method according to claim 1, wherein, in the open-loop control means, a calculation of the first manipulated variable component is performed with an inverse model of the control path.

4. The method according to claim 3, wherein, in the inverse model of the control path, at least one or more of model parameters of a fluid valve movably coupled with the actuator, from the group: fluid mass flow, fluid pressure, or valve body restoring force, are taken into account.

5. The method according to claim 3, wherein, in the closed-loop control means, in addition to the calculation of the second manipulated variable component, a calculation is performed with a fault model and/or wherein, in the open-loop control means, in addition to the calculation of the first manipulated variable component with the inverse model of the control path, a calculation of a control fault value is performed with an inverse fault model.

6. The method according to claim 1, wherein the monitoring means perform a monitoring of the second manipulated variable component and wherein the monitoring means provides the fault signal if the exceeding of the predefinable threshold component at the control signal by the second manipulated variable component lasts for longer than a predefinable timespan or an integral of the second manipulated variable component exceeds a predefinable value.

7. The method according to claim 1, wherein the open-loop control means calculates the first manipulated variable component with flatness-based pilot control and wherein the closed-loop control means, on the basis of the sensor signal, performs an adaptation of the control signal to the movement values (xd(t), x'd(t), x"d(t), x'''d(t)) provided with the second manipulated variable component.

8. The method according to claim 1, wherein, in the event also of exceeding a predefinable threshold component at the control signal by the second manipulated variable component, continued driving of the actuator is performed.

9. A movement controller for an actuator, comprising an input interface, configured to receive a setpoint position, with a drive interface, configured to provide a power flow to an actuator and for receipt by a position sensor associated with the actuator, with a computing unit, the computing unit being in the form of a microprocessor with memory and configured to process the setpoint position in a control signal and with a power amplifier arrangement, configured to provide the power flow to the drive interface as a function of the control signal, wherein the computing unit is configured to:

provision of the setpoint position to a path planning unit and calculation of movement values (xd(t), x'd(t), x"d(t), x'''d(t)) from the setpoint position;

provision of the movement values (xd(t), x'd(t), x"d(t), x'''d(t)) by the path planning unit to an open-loop control means and a closed-loop control means, the movement values being values selected from the group consisting of: a position of the actuator; a velocity of the actuator; an acceleration of the actuator; a jolt of the actuator;

calculation of a first manipulated variable component dependent on the movement values (xd(t), x'd(t), x"d(t), x'''d(t)) in the open-loop control means;

calculation of a second manipulated variable component dependent on the movement values (xd(t), x'd(t), x"d(t), x'''d(t)) and on position signals of a position sensor assigned to the actuator in the closed-loop control means;

combining of the first and the second manipulated variable component in a control unit; and provision of a control signal resulting from the manipulated variable components to the actuator, wherein a monitoring means performs a monitoring of at least one of the first manipulated variable component from the open-loop control means and the second manipulated variable component from the closed-loop control means, and provides a fault signal if the monitored manipulated variable component exceeds a predefined threshold component at the control signal.

10. The movement controller according to claim 9, wherein the computing unit contains the path planning unit, the open-loop control means, the closed-loop control means, the monitoring means and the open-loop control unit as software modules.

11. The movement controller according to claim 9, wherein the computing unit contains the path planning unit, the open-loop control means, the closed-loop control means, the monitoring means and the open-loop control unit as components of an electronic circuit.

12. The movement controller according to claim 9, wherein an actuator configured as a fluidic actuator is connected to the drive interface, and wherein the power amplifier arrangement is configured as a valve arrangement for provision of a fluidic power flow to the actuator.

13. The movement controller according to claim 9, wherein an actuator configured as an electric actuator is connected to the drive interface and that the power amplifier arrangement is configured as an electronic switch arrangement for providing an electric power flow to the actuator.

14. The movement controller according to claim 12, wherein the actuator is movably coupled with a fluid valve, and wherein, in an inverse model, the control path includes a plurality of model parameters of the fluid valve from the group: fluid mass flow, fluid pressure, and valve body restoring force.

15. A method for operating an electric or fluidic actuator for which a setpoint position is predefined, the method comprising:

provision of a computing unit to the electric or fluidic actuator, the computing unit being configured as an application specific integrated circuit (ASIC) comprising a path planning unit, a monitoring means, an open-loop control means, a closed-loop control means and a control unit;

provision of the setpoint position to the path planning unit and calculation of movement values ($x_d(t)$, $x'_d(t)$, $x''_d(t)$, $x'''_d(t)$) from the setpoint position, the movement values being values selected from the group consisting of: a position of the actuator; a velocity of the actuator; an acceleration of the actuator; a jolt of the actuator;

provision of the movement values ($x_d(t)$, $x'_d(t)$, $x''_d(t)$, $x'''_d(t)$) by the path planning unit to the open-loop control means and the closed-loop control means;

calculation of a first manipulated variable component dependent on the movement values ($x_d(t)$, $x'_d(t)$, $x''_d(t)$, $x'''_d(t)$) in the open-loop control means;

calculation of a second manipulated variable component dependent on the movement values ($x_d(t)$, $x'_d(t)$, $x''_d(t)$, $x'''_d(t)$) and on position signals of a position sensor assigned to the actuator in the closed-loop control means;

combining of the first and the second manipulated variable component in the control unit; and provision of a control signal resulting from the manipulated variable components to the actuator, wherein the monitoring means performs a monitoring of at least one of the first manipulated variable component from the open-loop control means and the second manipulated variable component from the closed-loop control means, and provides a fault signal if the monitored manipulated variable component exceeds a predefined threshold component at the control signal.

* * * * *